(12) United States Patent
Feigel

(10) Patent No.: US 9,604,614 B2
(45) Date of Patent: Mar. 28, 2017

(54) METHOD FOR OPERATING A BRAKE SYSTEM, AND BRAKE SYSTEM

(71) Applicant: Continental Teves AG & Co. oHG, Frankfurt (DE)

(72) Inventor: Hans-Jörg Feigel, Rosbach (DE)

(73) Assignee: Continental Teves AG & Co. oHG, Frankfurt (DE)

(*) Notice: Subject to any disclaimer, the term of this patent is extended or adjusted under 35 U.S.C. 154(b) by 27 days.

(21) Appl. No.: 14/382,836

(22) PCT Filed: Mar. 5, 2013

(86) PCT No.: PCT/EP2013/054360
§ 371 (c)(1),
(2) Date: Sep. 4, 2014

(87) PCT Pub. No.: WO2013/131889
PCT Pub. Date: Sep. 12, 2013

(65) Prior Publication Data
US 2015/0021978 A1    Jan. 22, 2015

(30) Foreign Application Priority Data

Mar. 6, 2012   (DE) .................. 10 2012 203 493
Mar. 4, 2013   (DE) .................. 10 2013 203 589

(51) Int. Cl.
*B60T 8/17*    (2006.01)
*B60T 8/36*    (2006.01)
(Continued)

(52) U.S. Cl.
CPC .......... *B60T 8/3655* (2013.01); *B60T 8/172* (2013.01); *B60T 8/36* (2013.01); *B60T 11/103* (2013.01);
(Continued)

(58) Field of Classification Search
CPC ...... B60T 8/172; B60T 15/028; B60T 11/103; B60T 7/042; B60T 8/3655
See application file for complete search history.

(56) References Cited

U.S. PATENT DOCUMENTS 5,234,261 A    8/1993  Leyes
6,030,055 A    2/2000  Schubert
(Continued)

FOREIGN PATENT DOCUMENTS

DE    4016754      11/1991
DE    19707960     9/1998
(Continued)

OTHER PUBLICATIONS

International Search Report for PCT/EP2013/054360 mailed May 7, 2013.
(Continued)

*Primary Examiner* — Anna Momper
(74) *Attorney, Agent, or Firm* — RatnerPrestia

(57) ABSTRACT

A method and system for operating a brake system for motor vehicles, including a plurality of wheel brakes for which wheel-individual nominal pressure includes an electrically controllable pressure supply device, to provide a brake system pressure for actuating the wheel brakes. The brake system pressure provided by the pressure supply device can be determined. An electrically controllable inlet valve and electrically controllable outlet valve per wheel brake adjust wheel-individual brake pressures. At least one outlet valve is analogized for analog-controlled and is controlled by an electric control variable, wherein at least one valve-specific control characteristic and/or a valve-specific parameter is determined for the analogized or analog-controlled outlet valve by the brake system, and wherein the analogized or analog-controlled outlet valve is controlled as a function of the valve-specific control characteristic and/or the valve- (Continued)

specific parameter for the degradation of the brake pressure in the wheel brake associated with the outlet valve.

13 Claims, 5 Drawing Sheets

(51) Int. Cl.
    *B60T 8/172*     (2006.01)
    *B60T 17/22*     (2006.01)
    *B60T 11/10*     (2006.01)
    *B60T 15/02*     (2006.01)
    *B60T 8/40*     (2006.01)
    *B60T 7/04*     (2006.01)
    *B60T 11/16*     (2006.01)

(52) U.S. Cl.
    CPC ............ *B60T 15/028* (2013.01); *B60T 17/22* (2013.01); *B60T 7/042* (2013.01); *B60T 8/4081* (2013.01); *B60T 11/16* (2013.01)

(56) References Cited

U.S. PATENT DOCUMENTS

| | | | |
|---|---|---|---|
| 7,140,699 B2 | 11/2006 | Gronau | |
| 8,655,567 B2 | 2/2014 | Watanabe | |
| 8,718,895 B2 | 5/2014 | Loos | |
| 2003/0098613 A1 | 5/2003 | Bohm | |
| 2007/0252098 A1 | 11/2007 | Schmidt | |
| 2010/0090521 A1* | 4/2010 | Loos | B60T 8/36 303/20 |
| 2012/0169112 A1 | 7/2012 | Jungbecker | |
| 2012/0215414 A1* | 8/2012 | Watanabe | B60T 8/36 701/70 |

FOREIGN PATENT DOCUMENTS

| | | |
|---|---|---|
| DE | 10147181 | 12/2002 |
| DE | 102011075295 | 11/2012 |
| JP | 2004501026 | 1/2004 |
| WO | 03068574 | 8/2003 |
| WO | 2005054028 | 6/2005 |
| WO | 2005063539 | 7/2005 |
| WO | 2007042349 | 4/2007 |
| WO | 2011029812 | 3/2011 |
| WO | 2011055419 | 5/2011 |

OTHER PUBLICATIONS

German Search Report mailed Oct. 21, 2013 in counterpart German Application No. 10 2013 203 589.6, including partial translation.
Written Opinion of the International Searching Authority for International Application No. PCT/EP2013/054360.
Japanese Office Action mailed Jan. 7, 2016 in Japanese Application No. 201380014607.9.

* cited by examiner

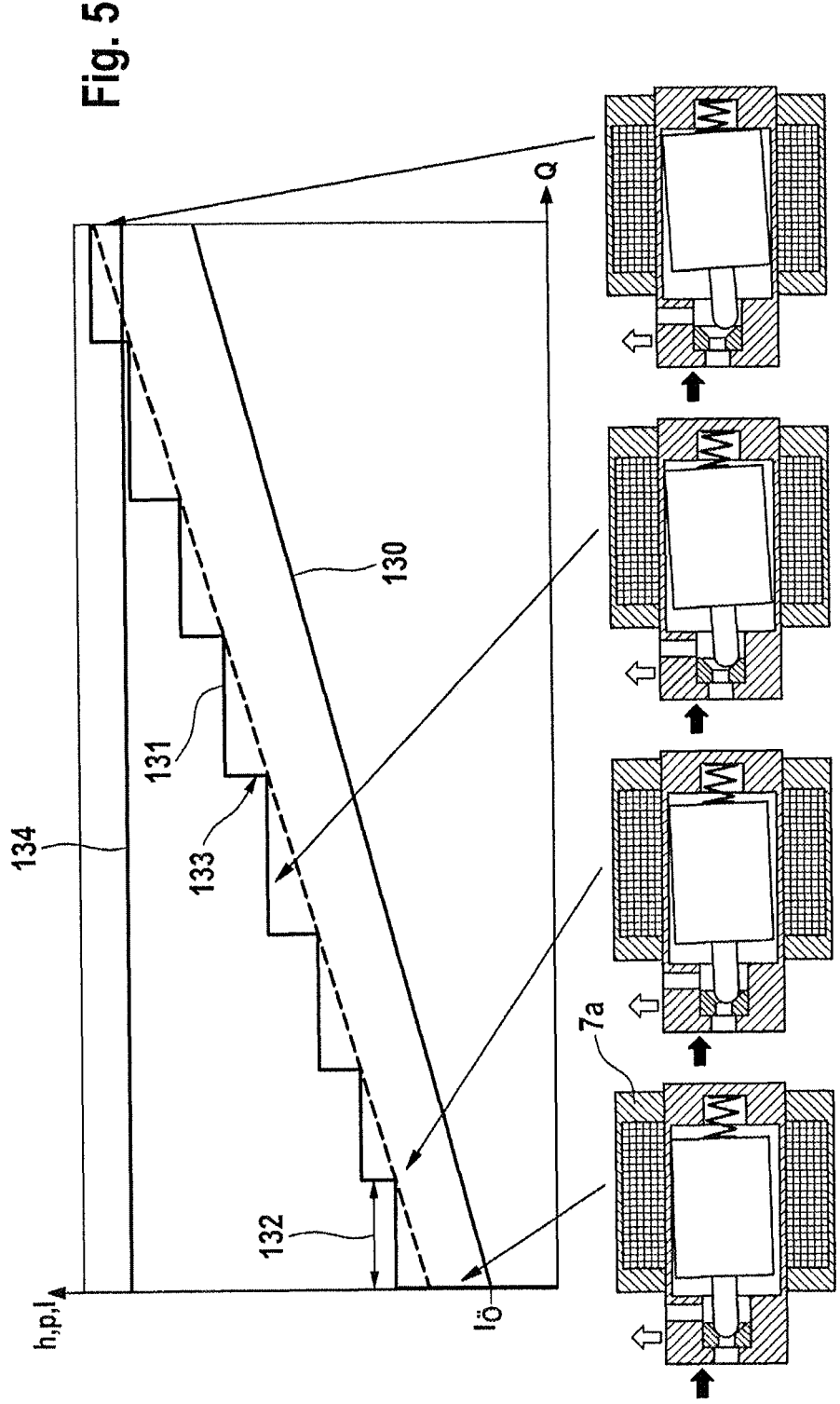

METHOD FOR OPERATING A BRAKE SYSTEM, AND BRAKE SYSTEM

CROSS REFERENCE TO RELATED APPLICATIONS

This application is the U.S. National Phase Application of PCT/EP2013/054360, filed Mar. 5, 2013, which claims priority to German Patent Application Nos. 10 2012 203 493.5, filed Mar. 6, 2012 and 10 2013 203 589.6, filed Mar. 4, 2013, the contents of such applications being incorporated by reference herein.

FIELD OF THE INVENTION

The invention relates to a method for operating a brake system for motor vehicles and to a brake system for motor vehicles.

BACKGROUND OF THE INVENTION

"Brake-by-wire" brake systems are becoming increasingly widespread in the automotive industry. In addition to a brake master cylinder that can be actuated by the vehicle driver, such brake systems often comprise an electrically controllable pressure supply device, by means of which actuation of the wheel brakes or of the brake master cylinder takes place in the "brake-by-wire" operating mode. In order to give the vehicle driver a pleasant pedal feel in the "brake-by-wire" operating mode, the brake systems usually comprise a brake pedal feel simulation device. In these brake systems, the wheel brake can be actuated on the basis of electronic signals even without the active intervention of the vehicle driver. These electronic signals can be output by an electronic stability program or an active cruise control system, for example.

DE 101 47 181 A1, which is incorporated by reference, discloses an electrohydraulic brake-by-wire brake system having wheel brakes, an electrically controllable auxiliary pressure source and inlet and outlet valves capable of analog control. A method for activating the analog outlet valves is not disclosed.

SUMMARY OF THE INVENTION

An aspect of the present invention provides a method for operating a brake system and a brake system which allows finely metered and accurate reduction of a wheel brake pressure. At the same time, noise generation should be kept as low as possible for reasons of comfort.

The concept underlying the invention is that at least one valve-specific control characteristic and/or one valve-specific parameter is determined for the analogized or analog-controlled outlet valve by means of the brake system. To reduce the brake pressure in the wheel brake associated with the outlet valve, the analogized or analog-controlled outlet valve is then controlled in accordance with the valve-specific control characteristic and/or the valve-specific parameter. The valve-specific control characteristic or the valve-specific parameter reflects the valve-specific friction conditions in the outlet valve and hence, when taken into account in control, allows precise pressure reduction control.

The inlet valves are each preferably arranged between the pressure supply device and the associated wheel brake, with the result that a connection can be established or interrupted between the wheel brake and the pressure supply device by means of the inlet valve.

The brake system preferably comprises an analogized or analog-controlled inlet valve for each wheel brake, thus also making it possible to carry out a precise wheel-specific brake pressure buildup.

In the unactivated state, the inlet valves preferably allow the respective brake circuit pressures through (open when deenergized).

The outlet valves are preferably each arranged between the associated wheel brake and a pressure medium reservoir, thus allowing the wheel brake to be connected to the pressure medium reservoir.

In the unactivated state, the outlet valves are preferably in a blocked state (closed when deenergized).

Synchronous wheel-specific pressure reduction control is preferably carried out on two or more wheel brakes. The brake system therefore preferably comprises an analogized or analog-controlled outlet valve for each wheel brake.

According to a preferred embodiment of the method according to the invention, a valve-specific opening characteristic curve of the outlet valve is determined by means of the pressure supply device and of a pressure detection device which measures the pressure of the pressure supply device. The opening characteristic curve describes the control variable for opening the outlet valve as a function of the brake pressure of the wheel brake associated with the outlet valve.

A valve-specific closing characteristic curve of the outlet valve is likewise preferably determined by means of the pressure supply device and of a pressure detection device which measures the pressure of the pressure supply device. The closing characteristic curve describes the control variable for closing the outlet valve as a function of the brake pressure of the wheel brake associated with the outlet valve.

To reduce the brake pressure, the outlet valve is preferably supplied alternately for a first time period with a value of the control variable equal to or above the opening current of the outlet valve and for a second time period with a value of the control variable below the closing current of the outlet valve. It is advantageous if the value of the control variable during the first time period is equal to or only slightly greater in magnitude than the opening current, thus preventing or at least reducing hammering noises of the valve.

A value is preferably specified for the second time period, thus ensuring reliable closing of the outlet valve. In contrast, the first time period is determined as a valve-specific parameter by means of the brake system in order to take account of the specific behavior of the outlet valve in the process of control.

In order to achieve as precise as possible setting of the desired setpoint profile by valve-specific control, the first time period is, according to a development of the invention, determined in accordance with a valve-specific minimum pressure gradient and with a desired setpoint pressure gradient.

In order to be able to choose a suitable control variable for each setpoint pressure profile, a control characteristic map, which describes the volume flow through the outlet valve as a function of the control variable of the outlet valve and the brake pressure of the wheel brake associated with the outlet valve, is preferably determined by means of the pressure supply device.

The pressure medium volume output by the pressure supply device or the volume flow output by the pressure supply device can preferably be determined. For this purpose, a location or position detecting device, by means of which a variable characterizing the position or location of the pressure supply device can be determined, is particularly preferably provided in or on the pressure supply device. It is advantageous if this is a sensor for detecting the rotor location of an electric motor of the pressure supply device or a sensor for detecting a pump position. By means of the rotor location or the time change in the rotor location, the pressure medium volume output by the pressure supply device or the volume flow output can be determined in a simple and accurate manner.

The control characteristic map is preferably determined by means of a speed control operation on the pressure supply device.

To take account of the specific behavior of the outlet valve during control, a valve-specific minimum volume flow or a valve-specific minimum pressure gradient of the outlet valve is determined according to a preferred embodiment of the method according to the invention. As a particularly preferred option, the valve-specific minimum volume flow or the valve-specific minimum pressure gradient of the outlet valve is determined for different input pressures of the outlet valve, i.e. for different brake pressures of the wheel brake associated with the outlet valve.

A setpoint pressure gradient is then preferably determined from the current brake pressure and a specified setpoint pressure of the wheel brake and is compared with the minimum volume flow or the minimum pressure gradient, and the outlet valve is controlled is carried out in accordance with the comparison. As a particularly preferred option, the value of the control variable for the outlet valve and/or a duration of a control operation of the outlet valve is chosen in accordance with the comparison. A simple means of taking into account the specific valve behavior is achieved by determining the first time period in accordance with the comparison between the setpoint pressure gradient and the minimum volume flow/minimum pressure gradient.

According to an advantageous development of the invention, to change the brake pressure in the wheel brake associated with the outlet valve, the inlet valve of the wheel brake is controlled in such a way that it is closed but can be overridden, and all the other inlet valves are controlled in such a way that they are closed and cannot be overridden. It is thereby possible for the pressure medium volume output by the pressure supply device to be assigned clearly to this wheel brake and thus, by means of the volume/characteristic curve of the wheel brake, to infer the pressure increase achieved or to achieve the desired pressure increase by means of a specific volume displacement.

As a particularly preferred option, the outlet valve is supplied with a value of the control variable approximately equal to the opening current or below the opening current by a specified (small) amount, with the result that overriding of the inlet valve and of the outlet valve of the corresponding wheel brake is possible by means of the pressure supply device. The pressure supply device is then advantageously controlled in such a way that the volume flow output by the pressure supply device is greater than a valve-specific minimum volume flow of the outlet valve. This is intended to ensure that the desired wheel brake pressure is also set by means of the control of the outlet valve.

An aspect of the invention also relates to a brake system in which a method according to the invention is carried out.

The method is preferably carried out in a brake system having one or more brake circuits, in which each brake circuit is connected by a hydraulic connecting line with an isolating valve, advantageously an isolating valve which is open when deenergized, to the brake master cylinder and by a further hydraulic connecting line with a connection valve, advantageously a connection valve which is closed when deenergized, to the pressure supply device.

The brake system preferably comprises a pedal travel simulator, which gives the vehicle driver a pleasant brake pedal feel in the "brake-by-wire" operating mode. As a particularly preferred option, the pedal travel simulator is of hydraulic design and is connected or can be connected to the brake master cylinder. The pedal travel simulator can advantageously be switched on and off by means of a simulator enable valve.

The pressure supply device is preferably formed by a cylinder-piston arrangement, the piston of which can be actuated by an electromechanical actuator. In this case, the pressure medium volume output or received by the pressure supply device is advantageously determined by means of a travel detection device or a location detection device, which detects a variable that characterizes a position or location of the piston. It is advantageous if a rotor location of the electromechanical actuator of the pressure supply device is detected. By means of the rotor location, the pressure medium volume output by the pressure supply device or the volume flow output by the pressure supply device can be determined.

As an alternative, it is preferred if the pressure supply device is formed by a six-piston pump which comprises a pump position sensor.

This is preferably a brake system for motor vehicles which can be controlled both by the vehicle driver and also independently of the vehicle driver in a "brake-by-wire" operating mode, and is preferably operated in the "brake-by-wire" operating mode and can be operated in at least one fallback operating mode, in which only operation by the vehicle driver is possible.

BRIEF DESCRIPTION OF THE DRAWINGS

Further preferred embodiments of the invention will emerge from the dependent claims and from the following description by means of figures.

In the schematic drawing:

FIG. 5 shows an illustrative control current/volume flow characteristic curve of an analog outlet valve.

DETAILED DESCRIPTION OF THE INVENTION

Figure 1:
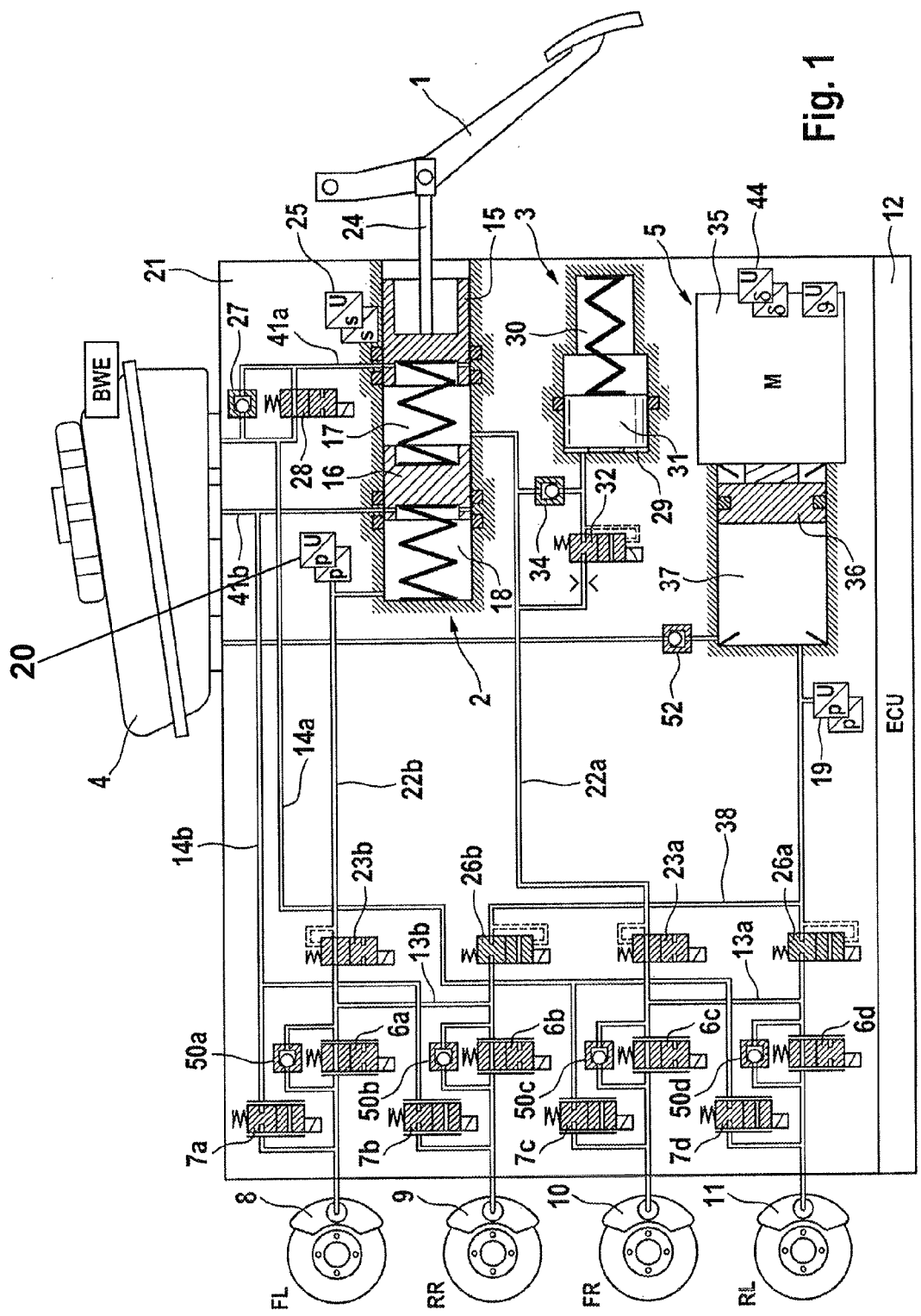
FIG. 1 shows an illustrative brake system for carrying out a method according to the invention.

An illustrative brake system for carrying out a method according to the invention is shown schematically in FIG. 1. The brake system essentially comprises a hydraulic actuating unit 2 that can be actuated by means of an actuating or brake pedal 1, a travel simulator or simulation device 3 that interacts with the hydraulic actuating unit 2, a pressure medium reservoir 4 that is associated with the hydraulic actuating unit 2 and is under atmospheric pressure, an electrically controllable pressure supply device 5, an electronic control and regulating unit 12 and an electrically controllable pressure modulation device.

According to the example, the pressure modulation device comprises, for each wheel brake 8, 9, 10, 11 of a motor vehicle (not shown), an inlet valve 6a-6d, which is preferably open when deenergized, and an outlet valve 7a-7d, which is preferably closed when deenergized, said valves being connected together hydraulically in pairs via center ports and connected to the wheel brakes 8, 9, 10, 11. The inlet ports of the inlet valves 6a-6d are supplied by means of brake circuit supply lines 13a, 13b with pressures which, in a "brake-by-wire" operating mode, are derived from a system pressure present in a system pressure line 38 connected to a pressure space 37 of the electrically controllable pressure supply device 5. In a fallback operating mode, the brake circuit supply lines 13a, 13b are subjected to the pressures of the pressure spaces 17, 18 of the actuating unit 2 via hydraulic lines 22a, 22b. The outlet ports of the outlet valves 7a-7d are connected to the pressure medium reservoir 4 in pairs by return lines 14a, 14b. In the example, the two brake circuits are split diagonally. The first brake circuit (13a) comprises the wheel brakes at the front right 10 (FR) and at the rear left 11 (RL), and the second brake circuit (13b) comprises the wheel brakes at the front left 8 (FL) and at the rear right 9 (RR).

According to the example, a check valve 50a-50d opening toward the brake circuit supply lines 13a, 13b is connected in parallel with each of the inlet valves 6a-6d. The check valves 50a-50d have the effect that a wheel brake pressure is never higher than the pressure of the pressure supply device 5. As a result—unlike the situation in a brake system with multiplex valves—it is not possible for a wheel brake pressure to be lowered by lowering the pressure of the pressure supply device without likewise simultaneously lowering all the wheel brake pressures.

The wheel brakes 8-11 are thus each connected separably to the pressure supply device by the inlet valve 6a-6d. Each wheel brake 8-11 can be connected to the pressure medium reservoir 4 by means of the outlet valve 7a-7d. Here, at least one outlet valve, according to the example each outlet valve 7a-7d, is embodied as an analogized or analog-controlled valve. According to the example, the inlet valves 6a-6d are also embodied as analogized or analog-controlled valves.

The hydraulic actuating unit 2 has, in a housing 21, two pistons 15, 16 arranged in series, which delimit hydraulic chambers or pressure spaces 17, 18 that, together with the pistons 15, 16, form a dual-circuit brake master cylinder or a tandem master cylinder. The pressure spaces 17, 18 are connected, on the one hand, to the pressure medium reservoir 4 via radial bores formed in the pistons 15, 16 and via corresponding pressure compensating lines 41a, 41b, wherein said bores and lines can be shut off by a relative movement of the pistons 17, 18 in the housing 21, and, on the other hand, by means of the hydraulic lines 22a, 22b to the brake circuit supply lines 13a, 13b already mentioned, via which the inlet valves 6a-6d are connected to the actuating unit 2. In this case, a diagnostic valve 28 which is open when deenergized is connected in parallel in the pressure compensating line 41a with a check valve 27 that closes toward the pressure medium reservoir 4. A piston rod 24 couples the pivoting movement of the brake pedal 1 due to a pedal actuation to the translational movement of the first (master cylinder) piston 15, the actuating travel of which is detected by a travel sensor 25, preferably embodied in a redundant manner. As a result, the corresponding piston travel signal is a measure of the brake pedal actuation angle. It represents a braking demand by a vehicle driver.

Respective isolating valves 23a, 23b, which are designed as electrically actuable valves, which are preferably open when deenergized, are arranged in the line sections 22a, 22b connected to the pressure spaces 17, 18. By means of the isolating valves 23a, 23b, the hydraulic connection between the pressure spaces 17, 18 and the brake circuit supply lines 13a, 13b can be shut off, e.g. in the normal braking function/ "brake-by-wire" operating mode. A pressure sensor 20 connected to line section 22b detects the pressure built up in pressure space 18 through a displacement of the second piston 16.

Travel simulator 3 is coupled hydraulically to the brake master cylinder 2 and consists essentially of a simulator chamber 29, a simulator spring chamber 30, and a simulator piston 31 separating the two chambers 29, 30 from one another. Simulator piston 31 is supported on the housing 21 by means of an elastic element (e.g. a spring), which is arranged in the simulator spring chamber 30 and is advantageously preloaded. The simulator chamber 29 can be connected to the first pressure space 17 of the tandem master cylinder 2 by means of an electrically actuable simulator enable valve 32. When a pedal force is specified and the simulator enable valve 32 is activated, pressure medium flows from brake master cylinder pressure space 17 into the simulator chamber 29. A hydraulic check valve 34 arranged antiparallel to the simulator enable valve 32 allows a largely unhindered return flow of the pressure medium from the simulator chamber 29 to brake master cylinder pressure space 17, independently of the operating state of the simulator enable valve 32.

According to the example, the electrically controllable pressure supply device 5 is designed as a hydraulic cylinder-piston arrangement or a single-circuit electrohydraulic actuator, the piston 36 of which can be actuated by a schematically indicated electric motor 35 via a rotary/translational mechanism, likewise illustrated schematically. Piston 36 delimits a pressure space 37. Additional pressure medium can be drawn into pressure space 37 by retraction of the piston 36 with the connection valves 26a, 26b closed, allowing pressure medium to flow out of the pressure medium reservoir 4, via an anti-cavitation valve 52 designed as a check valve which opens in the direction of flow to the actuator, into the actuator pressure space 37.

To detect a variable s characteristic of the position/location of the piston 36 of the pressure supply device 5, there is a sensor 44 which, according to the example, is embodied as a rotor location sensor serving for the detection of the rotor location of the electric motor 35. Other sensors are likewise conceivable, e.g. a travel sensor for detecting the position/location of piston 36. By means of the variable characteristic of the position/location of piston 36, it is possible to determine the pressure medium volume V output or received by the pressure supply device 5. A pressure sensor 19, preferably of redundant design, is provided to detect the brake system pressure P produced by the pressure supply device 5.

The method according to the invention can also be carried out in an ESC brake system known per se having a return pump and a low-pressure accumulator for each brake circuit. A 6-piston pump with a pump position sensor is preferably used for this purpose. The volume flow which does not pass through the outlet valve would override the TCS valve.

Figure 2:
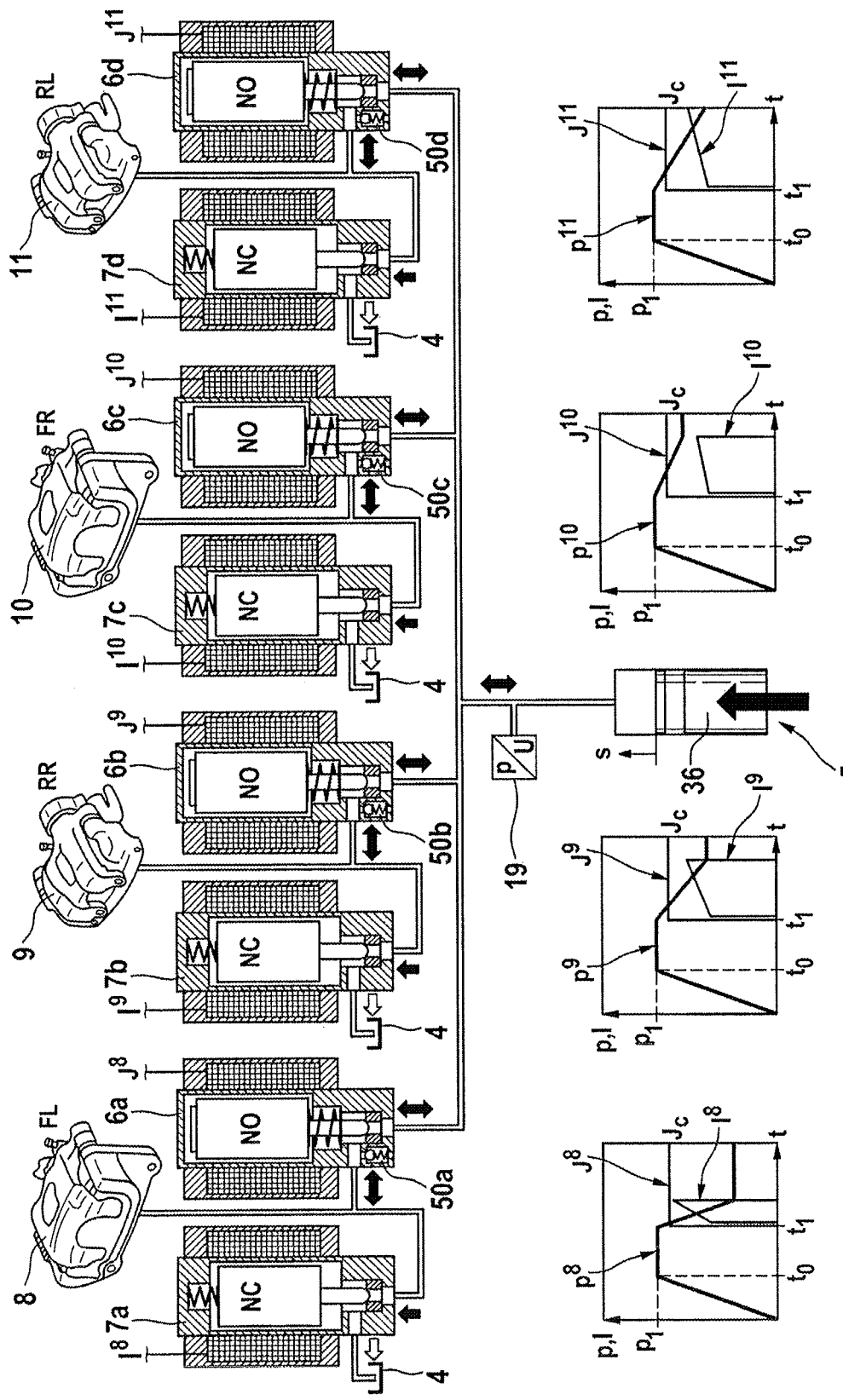
FIG. 2 shows a detail of the illustrative brake system in FIG. 1 for the purpose of explaining a first embodiment of a method according to the invention.

FIG. 2 shows schematically a detail of the brake system according to the example shown in FIG. 1 for the purpose of explaining a first embodiment of a method according to the invention. It shows the pressure supply device 5 with piston 36, the pressure sensor 19 for determining the brake system pressure P of the pressure supply device, the wheel brakes FL, RR, FR, RL or 8, 9, 10, 11, the inlet valves 6a-6d with check valves 50a-50d connected in parallel, which are each arranged in the hydraulic connection between the pressure supply device 5 and the inlet valve, and the outlet valves 7a-7d, which are each arranged in the hydraulic connection between the wheel brake and the pressure medium reservoir 4. Shown below the respective wheel brake 8, 9, 10, 11 there are furthermore diagrams showing the respective time profile of the control variable 3 of the inlet valves 6a, 6b, 6c, 6d, which are denoted by $J^8$, $J^9$, $J^{10}$, $J^{11}$, of the control variable I of the outlet valves 7a, 7b, 7c, 7d, which are denoted by $I^8$, $I^9$, $I^{10}$, $I^{11}$, and of the wheel brake pressure p of the individual wheel brakes 8, 9, 10, 11, which are denoted by $p^8$, $p^9$, $p^{10}$, $p^{11}$ and correspond to the respective specified setpoint pressure profile $p''_{soll}$ (n=8-11). According to the example, the outlet and inlet valves are controlled by means of a current, for which reason the term control current I or J is used below.

From time t=0 to time $t=t_0$, the brake pressure in all the wheel brakes 8, 9, 10, 11 is built up jointly and simultaneously from zero to a value $P_1$ by the pressure supply device and is then held constant at the pressure level $P_1$ until time $t=t_1$. Thus, according to the example, the pressure $P_1$ in all the wheel brakes 8, 9, 10, 11, which is equal to the pressure of the pressure supply device 5, is initially the same. After this, wheel-specific brake pressure reduction profiles are to be implemented on wheel brakes 8-11. These wheel-specific setpoint pressures or setpoint pressure time profiles $p''_{soll}$ (n=8, 9, 10 or 11) for the wheel brakes 8, 9, 10, 11 are specified by a control function of the brake system, for example (e.g. an antilock function (ABS: antilock system), an electronic stability control function (ESC: electronic stability control), and an active cruise control function (ACC: active cruise control) or the like). At the beginning of the wheel-specific brake pressure control operation, all the inlet valves 6a, 6b, 6c, 6d are closed at time $t_1$ and, for this purpose, are supplied with a control current value $J_c$, which ensures that the inlet valves are closed and remain closed. Shortly after time $t_1$, the analogized or analog-controlled outlet valves 7a, 7b, 7c, 7d are supplied with control currents $I^8$, $I^9$, $I^{10}$, $I^{11}$. Wheel-specific, synchronous pressure reduction control is carried out, wherein the proportioning of the pressure reduction at each wheel brake is carried out by means of pressure control of the analog outlet valve. For this purpose, the specified setpoint pressure $p''_{soll}$ and an actual wheel pressure $p''$, which is determined by means of a model, are used in each case.

Illustrative methods for determining data relevant to the pressure reduction control of an outlet valve, in particular a valve-specific control characteristic (e.g. characteristic curve or characteristic map) or a valve-specific control parameter (e.g. characteristic value) are described below. The various control characteristics or control parameters are preferably determined by these methods in the brake system itself, but it is also possible, at least to some extent, for other methods to be used for this purpose or for a control characteristic or control parameter to be specified in the electronic control and regulating unit 12, for example. Moreover, the steps described do not necessarily have to be carried out in the sequence indicated.

In a narrower sense, a control characteristic is taken to be a dependence I(p or $\Delta p$) of the electric valve control variable (e.g. of the control current I) on the differential pressure ($\Delta p$) present at the valve or on a pressure (p) present at the valve (in the case of constant pressure at the other valve port) (e.g. current/pressure characteristic curve (I/p characteristic curve), opening characteristic curve, closing characteristic curve). Moreover, the control characteristic is dependent on the volume flow Q through the valve, with the result that a valve is fully described by a control characteristic I(p or $\Delta p$, Q) (e.g. in the form of a current/pressure characteristic map with volume flow as a parameter, working current characteristic map, see the left-hand side of FIG. 3) or Q(I, p or $\Delta p$) (volume flow characteristic map).

Figure 3:
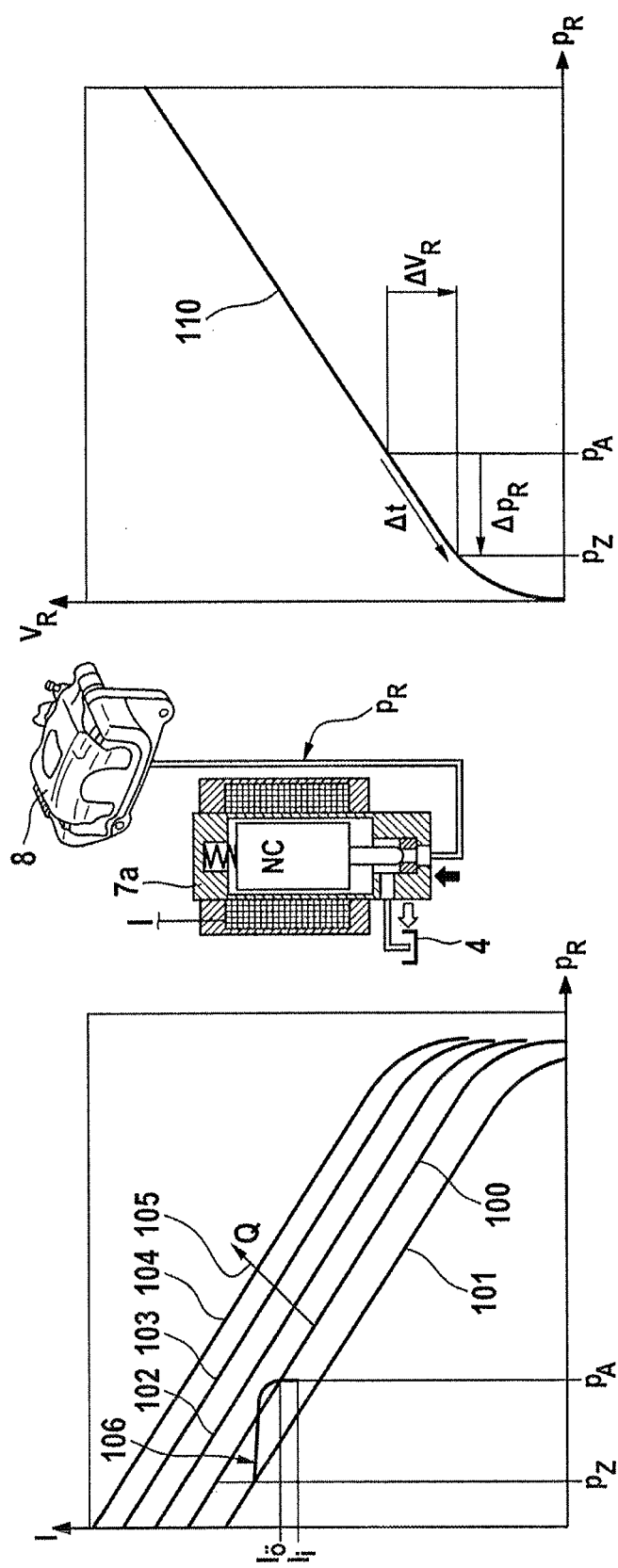
FIG. 3 shows illustrative current/pressure characteristic curves of an analog outlet valve and an illustrative volume/pressure characteristic curve of a wheel brake.

Wheel brake 8, which is considered below by way of example, is depicted in the center of FIG. 3, and can be connected to the pressure medium reservoir 4 by means of the analog-controllable outlet valve 7a, which is controlled by means of the control current I. Illustrative current/pressure characteristic curves for an analog outlet valve are shown in the left-hand diagram in FIG. 3. Here, the control current I (valve current) of the outlet valve is plotted against the wheel brake pressure $p_R$. Since the pressure on the output side of the outlet valve is approximately equal to atmospheric pressure $p_{atm}$ (pressure medium reservoir 4), the wheel brake pressure $p_R$ ($\Delta p = p_R - p_{atm}$) can be used as a variable for the characteristic curves instead of the normally used pressure difference $\Delta p$ across the valve. The left-hand diagram shows an opening current characteristic curve 100, a closing current characteristic curve 101 and a plurality of current/pressure characteristic curves 102, 103, 104 for constant volume flow Q, wherein the magnitude of the volume flow Q rises in a direction away from the opening current characteristic curve 100, this being indicated by the arrow 105.

First of all, an illustrative method for calibrating an outlet valve, according to the example outlet valve 7a, is described with respect to the opening characteristic curve thereof, said method being carried out in the brake system by means of the electronic control and regulating unit of the brake system. At a brake system pressure P of 0 bar and with the outlet valves 7a-7d closed, all the other inlet valves 6b, 6c, 6d are closed, apart from the inlet valve 6a corresponding to the outlet valve 7a to be measured. Inlet valve 6a is opened or remains open. The control current I of outlet valve 7a is set to a first specified value $I_1$. By means of the pressure supply device 5, a pressure buildup (from 0 bar) is carried out slowly (quasi-statically). The brake system pressure P, which, owing to the open inlet valve 6a, is equal to the wheel brake pressure $p_R$ of wheel brake 8, is monitored by means of the pressure sensor 19. When the outlet valve opens, a quasi-steady pressure level is established, corresponding to the control current value I. The associated pressure value $p_1$ is stored as a pair of values together with the current value $I_1$, e.g. in the control and regulating unit 12. The process described in this paragraph is then repeated for additional control current values $I_2$, $I_3$, $I_4$, . . . . The stored pairs of values ($I_k$, $p_k$) are used to determine an opening characteristic curve $I_Ö(p_R)$, e.g. by interpolation and/or extrapolation and storage of the interpolated and/or extrapolated values in a table of values or by determination of a functional approximation relationship $I_Ö=f_Ö(p_R)$. An illustrative opening characteristic curve is shown as curve 100 in the left-hand diagram in FIG. 3.

An illustrative method for calibrating an outlet valve, according to the example outlet valve 7a, is described below with respect to the closing characteristic curve thereof, said method being carried out in the brake system. All the other inlet valves 6b, 6c, 6d are preferably closed. Inlet valve 6a remains open. The outlet valve 7a under consideration is closed or is already closed. By means of the pressure supply device 5, a brake system pressure P, advantageously a high brake system pressure, is built up, and this is then also present in the associated wheel brake 8. The electric motor of the pressure supply device 5 is then stopped, and therefore no pressure medium volume can be displaced by the pressure supply device. The control current of outlet valve 7a is then increased abruptly to a first value $I_1$. When the current value $I_1$ is sufficiently high, outlet valve 7a opens, and the pressure in wheel brake 8 decreases. The actual pressure in the wheel brake is monitored by means of the pressure sensor 19. As the wheel brake pressure $p_R$ falls, outlet valve 7a closes at a certain wheel brake pressure $p_1$. Thus, at the current value $I_1$ a quasi-steady pressure level is established. The pair of values comprising the current value $I_1$ and the wheel brake pressure $p_1$ established is stored. The method steps described above are then repeated for additional control current values $I_2$, $I_3$, $I_4$, .... The stored pairs of values ($I_k$, $p_k$) are used to determine a closing characteristic curve $I_S(p_R)$, e.g. by interpolation and/or extrapolation and storage of the interpolated and/or extrapolated values in a table of values or by determination of a functional approximation relationship $I_S = f_S(p_R)$. An illustrative closing characteristic curve is shown as curve 101 in the left-hand diagram in FIG. 3.

In addition, an illustrative method for determining the smallest (mean) volume flow value $Q_{min}$ or the corresponding smallest (mean) pressure gradient $\dot{p}_{min}$ for various pressure levels $p_R$ for an outlet valve, according to the example outlet valve 7a, is described, this method being carried out in the brake system. All the other inlet valves 6b, 6c, 6d are preferably closed. Inlet valve 6a remains open. The outlet valve 7a under consideration is closed or is already closed. By means of the pressure supply device 5, a first brake system pressure and hence pressure in wheel brake 8 of value $p^1_A$ is set, and a speed control operation on the pressure supply device 5 is activated. The speed control is advantageously achieved by means of position control in combination with a ramp-shaped setpoint position profile. The control current of outlet valve 7a is then increased slowly, with the result that the outlet valve opens at some point. As soon as a reduction in the pressure is detected by means of the pressure sensor 19, the actual current value is determined and held constant. The subsequent pressure variation is observed. When a new pressure value $p^1_Z$ has stabilized, the pressure difference $\Delta p_R = p^1_A - p^1_Z$ with respect to the initial pressure $p^1_A$ and the time $\Delta t$ required for this are determined. The effective mean volume flow $Q_{min}$ for this operation is determined in accordance with $$Q_{min} = (V(p^1_A) - p^1_Z))/\Delta t$$

or the corresponding pressure gradient $\dot{p}_{min}$ is determined in accordance with $$\dot{p}_{min} = \Delta p_R / \Delta t = (p^1_A - p^1_Z)/\Delta t$$

The volume difference $V(p^1_A) - V(p^1_Z)$ is determined from the measured $\Delta p_R$ by means of the volume/pressure characteristic curve of the wheel brake.

The procedure described is then repeated for additional output pressures $p^2_A$, $p^3_A$, $p^4_A$, ....

The right-hand diagram in FIG. 3 shows an illustrative volume/pressure characteristic curve 110 of a wheel brake, representing the relationship between the pressure medium volume $V_R$ in the wheel brake and the wheel brake pressure $p_R$. The variables $p_A$, $p_Z$, $\Delta p_R = p_A - p_Z$, $\Delta t$ relevant to the method just described and the associated pressure medium output $\Delta V_R$ of the wheel brake are indicated for the purpose of clarification. The volume/pressure characteristic curves of wheel brakes 8-11 of a brake system can be measured at the end of the line during the production of the brake system, for example, and are taken as given or known. From a pressure gradient $\Delta p_R/\Delta t$ determined, it is possible, by means of the volume/pressure characteristic 110, to determine the associated pressure medium output per time interval $\Delta V_R/\Delta t$ and thus the mean volume flow $\overline{Q}$.

An illustrative method for determining the volume flow characteristic map of an outlet valve, according to the example outlet valve 7a, is described below, said method being carried out in the brake system. The volume flow characteristic map $Q(I, \Delta p)$ (or $Q(I, p_R)$) describes the volume flow Q through the outlet valve as a function of the control current I of the outlet valve and the pressure difference $\Delta p$ across the outlet valve or the wheel brake pressure $p_R$. For a fixed specified valve Q of the volume flow, the volume flow characteristic map $Q(I, p_R)$ gives a current/pressure characteristic curve $I(p_R)$ as illustrated, for example, in the left-hand diagram in FIG. 3 as characteristic curves 102, 103, 104 for various values of the volume flow Q. With inlet valves 6b, 6c, 6d closed and inlet valve 6a open, the actuator of the pressure supply device 5 is operated in speed control mode, with the result that the volume flow Q is given and known, and the established steady-state pressure P of the pressure supply device 5 is measured by means of pressure sensor 19 for various control current values $I_1$, $I_2$, $I_3$, ..., said pressure corresponding to the wheel brake pressure $p_R$. The pairs of data obtained are stored as a characteristic map $Q = f(I, p_R)$, e.g. in the electronic control and regulating control unit 12 of the brake system.

A general procedure for control of an outlet valve for carrying out a reduction of the wheel brake pressure $p_R$ from an initial value $p_A$ to a target value $p_Z$ is explained with reference to curve 106 in the left-hand diagram in FIG. 3. The outlet valve is first of all supplied with an initial current value $I_i$, which is below the opening current $I_Ö$ for the pressure value $p_A$. The control current I is then increased to, advantageously to just above, the opening current $I_Ö$. As a result, the outlet valve can be pushed open by the wheel brake pressure, i.e. the outlet valve is opened and there is a wheel brake pressure reduction. If the wheel brake pressure reaches the value $p_Z$, at which the closing current (characteristic curve 101) corresponds to the given value of the control current, the outlet valve closes again. The diagram does not show that the outlet valve is then supplied with a current value which is below the closing current $I_S$ (for the corresponding wheel brake pressure) in order to ensure that the outlet valve is closed. Leakage which distorts the measurement is thereby avoided.

At the start of a wheel-specific pressure reduction control operation at one wheel brake, e.g. wheel brake 8, the procedure according to the example is as follows. The initial actual pressure $p_{ist}$ in the wheel brake is determined by means of the pressure sensor 19 (with inlet valve 6a open). Inlet valve 6a is then closed. Furthermore, the actual pressure is predetermined by means of a model. From the specified desired setpoint pressure profile $p_{soll}(t)$, the next desired (lower) wheel setpoint pressure $p_{soll}$ is determined, and the required mean setpoint pressure gradient $\dot{p}_{soll}$ is determined in accordance with $\dot{p}_{soll} = (p_{ist} - p_{soll})/\Delta t$. This is also optionally carried out for the wheel setpoint pressure $p_{soll2}$ that follows this in time. The setpoint pressure gradient $\dot{p}_{soll}$ is compared with the smallest pressure gradient $\dot{p}_{min}$ of outlet valve 7a that has been determined (see above).

If the setpoint pressure gradient $\dot{p}_{soll}$ is less than the minimum pressure gradient $\dot{p}_{min}$, intersection of the desired setpoint pressure profile is ensured ("rule") since at least the minimum pressure reduction is carried out per time interval $\dot{p}_{min}$. The time period $\Delta t_Ö$ is determined, said time period determining the period for which the outlet valve is supplied with an opening current $I_Ö$ associated with the setpoint pressure $p_{soll}$, which can be taken from the predetermined opening current characteristic curve $I_Ö(p_R)$. In the example, the time period $\Delta t_Ö$ is determined in accordance with the formula $$\Delta t_Ö = \Delta p_{soll}/(\dot{p}_{min} - ((p_{ist} - p_{soll})/\Delta t))$$

where $\Delta p_{soll}$ is a specified, maximum permissible pressure deviation (e.g. $\Delta p_{soll} = 2$ bar).

If the setpoint pressure gradient $\dot{p}_{soll}$ is greater than the minimum pressure gradient $\dot{p}_{min}$, intersection of the setpoint pressure profile is not ensured. The outlet valve must therefore be opened further. For the required volume flow Q (corresponding to a somewhat greater setpoint pressure gradient $\dot{p}_{soll}$), the corresponding control current is selected from the volume flow characteristic map $Q(I,p_R)$ determined. The time period $\Delta t_Ö$ is determined, said time period determining the period for which the outlet valve is supplied with the opening current $I_Ö$ associated with the setpoint pressure $p_{soll}$, which can be taken from the predetermined opening current characteristic curve $I_Ö(p_R)$. In the example, the time period $\Delta t_Ö$ is determined in accordance with the formula $$\Delta t_Ö = \Delta p_{soll}/(\dot{p}_{soll} - ((p_{ist} - p_{soll})/\Delta t))$$

where $\Delta p_{soll}$ is a specified, maximum permissible pressure deviation (e.g. $\Delta p_{soll} = 2$ bar).

Figure 4:
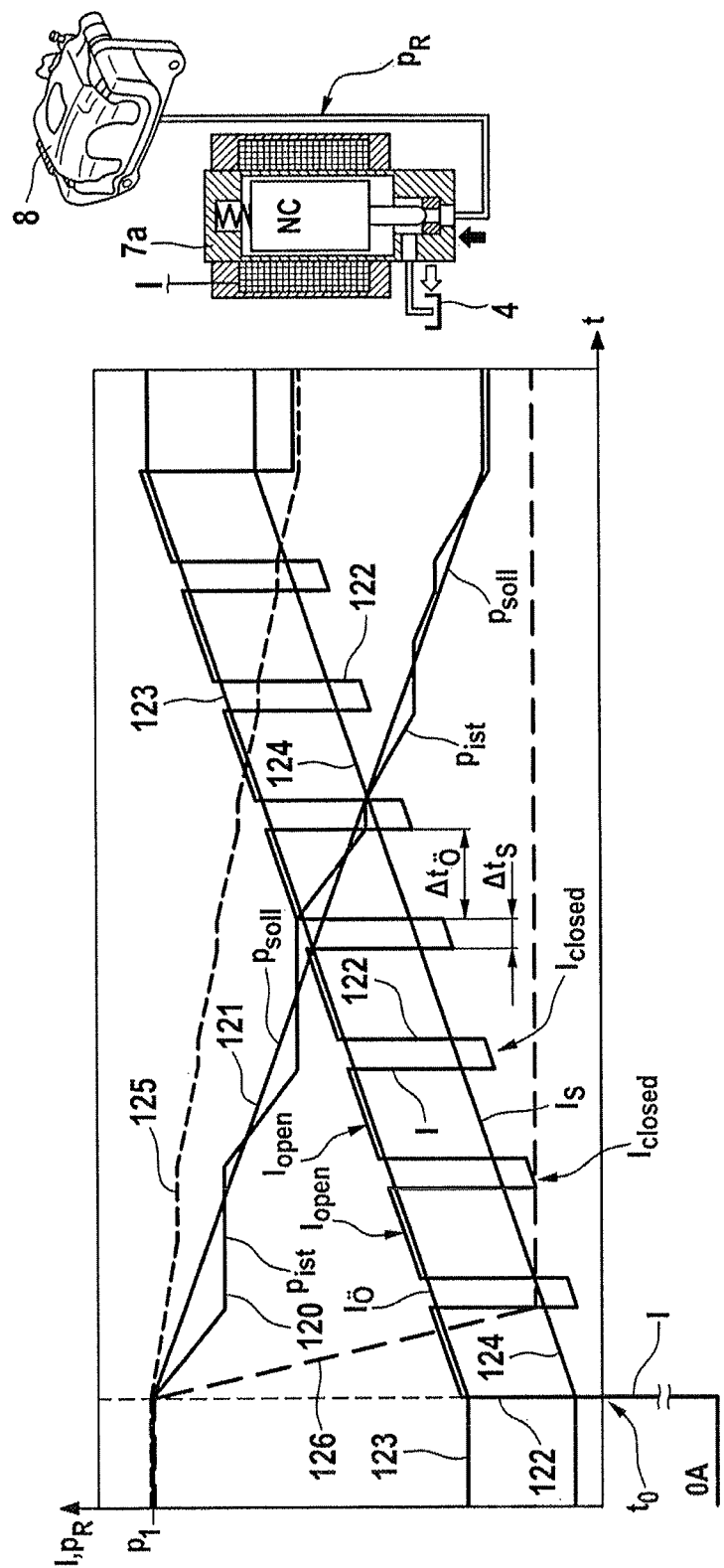
FIG. 4 shows illustrative time profiles for an illustrative method for analog pressure buildup at a wheel brake.

Thus, the significant control parameters, namely the control current profile to be input $I_{soll} = f(\dot{p}_{soll})$ (in particular $I_{open} = f(\dot{p}_{soll})$ in FIG. 4) as a function of the desired setpoint pressure gradient and the time period $\Delta t_Ö$, are determined. The time period $\Delta t_S$ in which the outlet valve is supplied with a control current $I_{closed}$ below the closing current $I_S$ for reliable closure (both variables being dependent on the current wheel brake pressure) is predetermined. It can be determined experimentally, for example, and is then fixed.

It is advantageous if the method described is carried out for each outlet valve 7a-7d and in each case for various setpoint pressure gradients.

The calibration data obtained, in particular the opening characteristic curve, the closing characteristic curve, the volume flow characteristic map, the minimum pressure gradient/volume flow, $I_{soll}(\dot{p}_{soll})$, $\Delta t_Ö(\dot{p}_{soll})$, and calculation rules are preferably used in the brake system to carry out test pressure reduction operations on a trial basis with the inlet valves of the other wheel brakes closed and a pressure supply device actuator held fixed in the position control circuit.

It is also advantageously possible to use a fuzzy controller to perform further optimization of the parameters $I_{soll}(\dot{p}_{soll})$, $\Delta t_Ö(\dot{p}_{soll})$ until a minimum deviation from the desired setpoint pressure profile is achieved.

A control operation is then carried out for each outlet valve with the parameters found.

It is advantageous if a change in the parameters is carried out only within predetermined default limiting values in order to prevent miscalculations.

Illustrative time profiles for an illustrative method for analog pressure reduction at one wheel brake, according to the example wheel brake 8, are shown in FIG. 4. This is a pressure reduction control operation with a constant closing pulse frequency. The diagram shows, as a function of time t, the actual wheel brake pressure $p_{ist}$ (curve 120), the setpoint wheel brake pressure $p_{soll}$ (curve 121), the control current I of outlet valve 7a (curve 122) and the corresponding profiles of the opening current $I_Ö$ (curve 123) and of the closing current $I_S$ (curve 124) (since both are dependent on the current wheel brake pressure). Up to time $t_0$, the outlet valve is closed (control current I equal to 0 amperes) and the wheel brake pressure has the constant value $P_1$. From time $t_0$, a brake pressure reduction is to be carried out with a constant setpoint pressure gradient, for which reason the associated inlet valve 6a is closed and the outlet valve is supplied with a control current $I_{open}$ ($I_{soll}$) above the opening current $I_Ö$ for a time period $\Delta t_Ö$. The actual pressure $p_{ist}$ falls accordingly. After the time period $\Delta t_Ö$, the control current I is lowered for a time period $\Delta tS$ to values $I_{closed}$ below the threshold current $I_S$ (referred to as the closing pulse), with the result that the outlet valve reliably closes. The cycle comprising the control current I above the opening current $I_Ö$ for the time period $\Delta t_Ö$ and the subsequent reduction to a value below the threshold current $I_S$ for the time period $\Delta t_S$ is then repeated.

In order to ensure that the actual pressure profile $p_{ist}(t)$ follows the setpoint pressure profile $p_{soll}(t)$ as closely as possible, as accurate as possible knowledge of the following variables is advantageous:

- accurate knowledge of the initial pressure $P_1$ before the pressure reduction. For this purpose, the wheel brake pressure is measured by means of the pressure sensor 19 with the inlet valve open, after which the pressure is determined by means of a pressure model.
- accurate knowledge of the opening current characteristic curve $I_Ö(p_R)$. This can be hydraulically calibrated in operation, e.g. as described above.
- a good knowledge of the volume flow Q of the outlet valve, i.e. of the smallest volume flow $Q_{min}$ (or $\dot{p}_{min}$) after the opening of the valve and the further volume flow ($p_R$) control current characteristic map. These variables too can be hydraulically calibrated in operation, e.g. as described above.
- accurate knowledge of the desired setpoint pressure gradient $\dot{p}_{soll}$.

Preferably, it is ensured that the actual pressure gradient is always greater than the setpoint pressure gradient, i.e. that a pressure profile according to curve 125 is avoided.

The closing pulse frequency is preferably chosen in such a way that there are no large pressure deviations caused by the actual pressure gradient being too great, i.e. that a pressure profile according to curve 126 is avoided.

FIG. 5 illustrates the determination of the smallest volume flow $Q_{min}$ or a control current volume flow characteristic curve Q(I) of the outlet valve for constant pressure. The diagram in FIG. 5 shows, as a function of the volume flow Q, the setpoint pressure $p_{soll}$ of the wheel brake (curve 134), the control current I of the outlet valve (curve 130) and the valve travel h of the outlet valve (curve 131). The curve in dashed lines shows an effective profile of curve 131. Selected valve states of the outlet valve are shown graphically below the diagram.

At a constant wheel brake pressure $p_{soll}$ (through appropriate control of the pressure supply device), the control pressure I is increased. At control currents I of zero up to the opening current $I_Ö$, the outlet valve is closed, with the result that the volume flow Q is zero. From the opening current $I_Ö$, the volume flow Q rises with the control current I. The relationship between the valve travel h and the volume flow Q is represented by curve 131. Owing to frictional effects occurring in the valve (hysteresis effect), there is a stepped relationship of dependence between the variables. Arrow 132 indicates the smallest volume flow jump and hence the smallest pressure gradient. Arrow 133 indicates a hysteresis-induced jump in the valve travel and hence a jump in the volume flow. The associated values of the control current I and the volume flow Q give the control current/volume flow characteristic curve Q(I).

According to another embodiment of a method according to the invention for wheel-specific analog pressure reduction control, the procedure is as follows. By way of example, the intention is to reduce the wheel brake pressure of wheel brake 8 (FL) (referred to as the "active wheel brake"). First of all, the pressure prevailing in the wheel brakes (initial pressure) is determined by means of pressure sensor 19. All the inlet valves 6a-6d are then closed, with inlet valves 6b, 6c, 6d being "firmly" closed, i.e. controlled in such a way that the inlet valves cannot be overridden by a pressure buildup of the pressure supply device. The outlet valves 7b, 7c, 7d are deenergized, i.e. closed. Inlet valve 6a of the active wheel brake 8 is "lightly" closed, i.e. inlet valve 6a is controlled in such a way, for example, that it can be overridden by a pressure buildup of the pressure supply device. The control current I of outlet valve 7a is set to the opening current $I_{Ö}$ (from the predetermined opening characteristic curve) corresponding to the initial pressure. The pressure supply device 5 is controlled in such a way (speed control of the actuator of the pressure supply device) that the volume flow of the pressure supply device is greater than the minimum volume flow $Q_{min}$ of the outlet valve 7a. The pressure medium volume displaced by the pressure supply device overrides inlet valve 6a. Given a knowledge of the pressure/current/volume flow characteristic map f(Δp, I, Q) of the inlet valve, it is possible to infer the wheel brake pressure $p_R$ of wheel brake 8 from the signal of the pressure sensor 19 (brake system pressure P). The pressure medium volume flowing into wheel brake 8 increases the wheel brake pressure $p_R$ to the opening pressure level of outlet valve 7a, allowing pressure medium to flow out of the wheel brake. A "dip" in the pressure buildup or the establishment of a steady-states wheel brake pressure is detected by the pressure sensor 19. The outlet valve 7a is then supplied with a closing pulse, causing the outlet valve to close fully, and the actuator of the pressure supply device 5 is stopped. The process can also be carried out with varying wheel pressure reduction inputs. In this way, the opening characteristic curve can be calibrated. The volume flow Q through the outlet valve is equal to the calculated wheel reduction volume flow plus the actuator volume flow, which is known from the control of the pressure supply device. This relationship is used in parameter determination. Monitoring of the process can be performed by means of the pressure sensor 18 and of the inlet valve characteristic map.

In known brake systems, in which pressure modulation is carried out by means of a highly dynamic pressure supply device having an actuator and wheel-specific multiplex valves, wheel-specific pressure setting of the individual wheel brakes is accomplished sequentially by fully opening the multiplex valve associated with the individual wheel brake and thus establishing a pressure equilibrium between the wheel brake and the pressure supply device. The pressure buildup or pressure reduction is accomplished by means of actuator adjustment (forward or reverse stroke). This multiplex method has the disadvantage that, with comfort-oriented (i.e. slow) wheel-specific four-wheel control, significant noise problems inherent in the principle, referred to as NVH problems (Noise Vibration Harshness), occur. The reasons for the generation of noise are essentially that the actuator has to set four different pressures individually (in succession) at very high frequency since otherwise excessive stepping of the pressure profile would have a disadvantageous effect on the braking behavior. This high frequency requires very rapid reversing operations by the actuator, which, on the one hand, must first of all actually be achievable by the actuator is (high costs for the actuator) and, on the other hand, lead to the associated generation of noise. Moreover, the multiplex valves must be opened and closed in rapid succession at extremely high speed. This is necessary since it is only the rapid actuation of the valves which allows the high multiplexing frequency. This leads to correspondingly loud impact noises within the valves, and these propagate throughout the entire assembly to the vehicle bulkhead. The pressure medium columns in the brake lines are likewise accelerated and decelerated again at extremely high speed. The inductivity of the pressure medium gives rise to the known noise effects.

The invention makes possible fine control of the brake pressures of the individual wheel brakes combined with the minimum generation of noise.

Another advantage of the invention is that comfortable and sufficiently accurate pressure reduction control can be achieved without additional outlay on sensors (e.g. a pressure sensor in the wheel brake circuit or an application force sensor in the wheel brake).

The invention preferably relates to synchronous pressure reduction control by means of analog or analogized pressure control valves 7a-7d. By virtue of the principle involved, analog pressure control valves have a large reversal hysteresis. The high spring preloading forces and the magnetic forces for opening the outlet valves, which are high at low wheel brake pressures, cause high frictional forces, which are the reason for the frictional hysteresis. These difficulties can be minimized through accurate determination of the various parameters of the outlet valves.

The invention claimed is:

1. A method for operating a brake system for motor vehicles, comprising:
    a plurality of heel brakes for which wheel-specific set-point pressures ($p''_{soll}$) are specified,
    an electrically controllable pressure supply device, which can provide a brake system pressure for actuating the wheel brakes, and
    an electrically controllable inlet valve and an electrically controllable outlet valve, the latter being arranged between the wheel brake and a pressure medium reservoir, per wheel brake for setting wheel-specific brake pressures ($p''_R$), wherein at least one outlet valve, each outlet valve, is analogized or analog-controlled and is controlled by an electric control variable ($I^n$),
    wherein at least one valve-specific control characteristic ($I_{Ö}(p_R)$, $I_s(p_R)$, $Q(I,p_R)$) and/or a valve-specific parameter ($Q_{min}$, $p_{min}$, $\Delta t_{Ö}$) is determined for the analogized or analog-controlled outlet valve by the brake system, and in that the analogized or analog-controlled outlet valve is controlled in accordance with the valve-specific control characteristic and/or the valve-specific parameter to reduce the brake pressure ($p_R$) in the wheel brake associated with the outlet valve,
    wherein to reduce the brake pressure, the analogized or analog-controlled outlet valve is supplied alternately for a first time period ($\Delta t_{Ö}$) with a value ($I_{open}$) of the control variable equal to or above an opening current ($I_{Ö}$) of the outlet valve and for a second time period ($\Delta t_s$) with a value ($I_{closed}$) of the control variable below a closing current ($I_s$) of the outlet valve, and
    wherein a duration of the first time period is calculated based on a valve-specific minimum pressure gradient ($\dot{p}_{min}$).

2. The method as claimed in claim 1, wherein the valve-specific control characteristic is a valve-specific opening characteristic curve ($I_\ddot{O}(p_R)$) of the at least one outlet valve which is determined by the pressure supply device and of a pressure detection device which measures the pressure (P) of the pressure supply device.

3. The method as claimed in claim 1, wherein the valve-specific control characteristic is a valve-specific closing characteristic curve ($I_s(p_R)$) of the at least one outlet valve which is determined by the pressure supply device and of a pressure detection device which measures the pressure (P) of the pressure supply device.

4. The method as claimed in claim 1, wherein a value is specified for the second time period ($\Delta t_s$) and In that the first time period ($\Delta t_\ddot{O}$) is determined as the valve-specific parameter by the brake system.

5. The method as claimed in claim 1, wherein the duration of the first time period ($\Delta t_\ddot{O}$) is also determined in accordance with a setpoint pressure gradient ($\dot{p}_{soll}$), the setpoint pressure gradient determined from the specified setpoint pressure ($p_{soll}$).

6. A method for operating a brake system for motor vehicles, comprising:
a plurality of wheel brakes, for which wheel-specific setpoint pressures ($p''_{soll}$) are specified,
an electrically controllable pressure supply device, which can provide a brake system pressure for actuating the wheel brakes, and
an electrically controlled inlet valve and an electrically controllable outlet valve, the latter being arranged between the wheel brake and a pressure medium reservoir, per wheel brake for setting wheel-specific brake pressures ($p''_R$), wherein at least one outlet valve, each outlet valve, is analogized or analog-controlled and is controlled by an electric control variable ($I''$),
wherein at least one valve-specific control characteristic ($I_\ddot{O}(p_R)$, $I_s(p_R)$, $Q(I,p_R)$) and/or a valve-specific parameter ($Q_{min}$, $p_{min}$, $\Delta t_\ddot{O}$) is determined for the analogized or analog-controlled outlet valve by the brake system, and in that the analogized or analog-controlled outlet valve is controlled in accordance with the valve-specific control characteristic and/or the valve-specific parameter to reduce the brake pressure ($p_R$) in the wheel brake associated with the outlet valve, and
wherein a control characteristic map (Q(I, $p_R$)), which describes the volume flow (Q) through the at least one outlet valve as a function of the control variable (I) of the at least one outlet valve and the brake pressure ($p_R$) of the wheel brake associated with the at least one outlet valve, is determined by the pressure supply device.

7. The method as claimed in claim 6, wherein the control characteristic map (Q(I, $p_R$)) is determined by a speed control operation on the pressure supply device.

8. The method as claimed in claim 1, wherein for different brake pressures ($p_R$) of the wheel brake associated with the at least one outlet valve, the valve-specific parameter is determined as a valve-specific minimum volume flow ($Q_{min}$) or a valve-specific minimum pressure gradient ($\dot{p}_{min}$) of the at least one outlet valve.

9. The method as claimed in claim 8, wherein a setpoint pressure gradient ($\dot{p}_{soll}$) is determined from the current brake pressure ($p_R$) and a specified setpoint pressure ($p_{soll}$) of the wheel brake and is compared with the minimum volume flow ($Q_{min}$) or the minimum pressure gradient ($\dot{p}_{min}$), and in that the at least one outlet valve is controlled in accordance with the comparison, the value of the control variable and/or a duration of the first time period ($\Delta t_\ddot{O}$), is chosen.

10. A method for operating a brake system for motor vehicles, comprising:
a plurality of wheel brakes, for which wheel-specific setpoint pressures $p''_{soll}$) are specified,
an electrically controllable pressure supply device, which can provide a brake system pressure for actuating the wheel brakes, and
an electrically controllable inlet valve and an electrically controllable outlet valve, the latter being arranged between the wheel brake and a pressure medium reservoir, per wheel brake for setting wheel-specific brake pressures ($p''_R$), wherein at least one outlet valve, each outlet valve, is analogized or analog-controlled and is controlled by an electric control variable ($I''$),
wherein at least one valve-specific control characteristic ($I_\ddot{O}(p_R)$, $I_s(p_R)$, $Q(I,p_R)$) and/or a valve-specific parameter ($Q_{min}$, $p_{min}$, $\Delta t_\ddot{O}$) is determined for the analogized or analog-controlled outlet valve by the brake system, and in that the analogized or analog-controlled outlet valve is controlled in accordance with the valve-specific control characteristic and/or the valve-specific parameter to reduce the brake pressure ($p_R$) in the wheel brake associated with the outlet valve, and
wherein the inlet valve of the one of the plurality of wheel brakes associated with the analogized or analog-controlled outlet valve is controlled in such a way that it is closed but can be overridden, and all the other inlet valves are controlled in such a way that they are closed and cannot be overridden, in order to change the brake pressure ($p_R$) in the one of the plurality of wheel brakes.

11. The method as claimed in claim 10, wherein the at least one outlet valve is supplied with a value of the control variable approximately equal to an opening current ($I_\ddot{O}$) or below the opening current ($I_\ddot{O}$) by a specified amount.

12. The method as claimed in claim 11, wherein the valve-specific parameter is determined as a valve-specific minimum volume flow, and the pressure supply device is controlled in such a way that the volume flow output by the pressure supply device is greater than the valve-specific minimum volume flow ($Q_{min}$) of the at least one outlet valve.

13. A brake system for motor vehicles, comprising:
a plurality of wheel brakes,
an electrically controllable pressure supply device, which can provide a brake system pressure for actuating the wheel brakes, wherein the brake system pressure (P) provided can be determined by a pressure detection device,
a brake master cylinder, which can be actuated by a brake pedal and is connected to the wheel brakes in a separable manner,
an electrically controllable inlet valve and an electrically controllable outlet valve, the latter being arranged between the wheel brake and a pressure medium reservoir, per wheel brake, wherein at least one outlet valve is analogized or analog-controlled, and
an electronic control and regulating unit for controlling the electrically controllable pressure supply device, the inlet valves and the outlet valves,
wherein the method as claimed in claim 6 carried out in the electronic control and regulating unit.

* * * * *